April 18, 1967  E. W. JOHNSON  3,314,719
ERECTING SEAT BELT
Filed Aug. 2, 1965
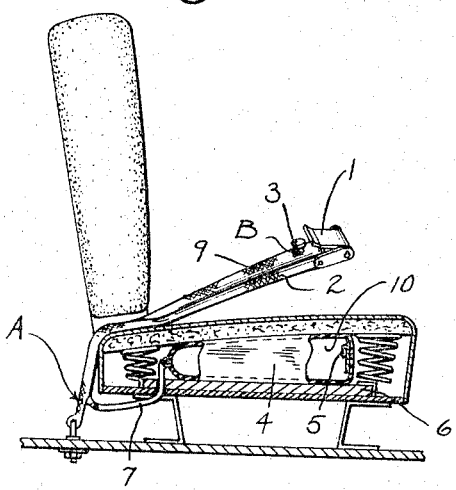
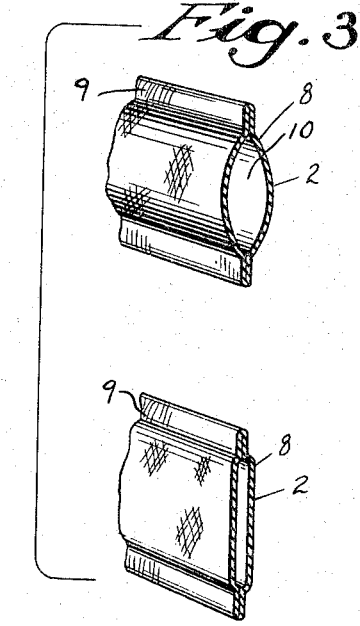
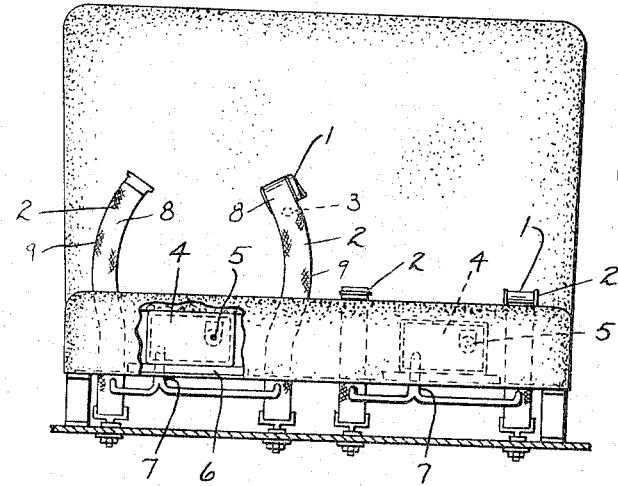
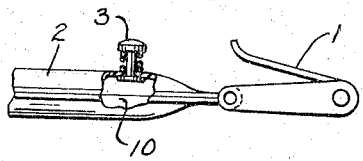
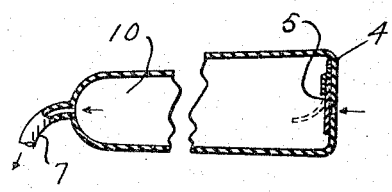
INVENTOR
EDSEL W. JOHNSON

United States Patent Office 3,314,719
Patented Apr. 18, 1967

3,314,719
ERECTING SEAT BELT
Edsel W. Johnson, 6260 S. Lake Drive, Apt. 308,
Cudahy, Wis. 53110
Filed Aug. 2, 1965, Ser. No. 476,519
8 Claims. (Cl. 297—385)

This invention relates to passenger safety seat belts for use in land vehicles, water craft, air cushion surface vehicles, aircraft and space vehicles. The purpose of this invention is to induce and facilitate the use of the installed passenger safety seat belt.

Reliable data from several safety organizations show that many installed seat belts are not fastened at the time of the accident, thus nullifying the intent of the safety belt and increasing the injury and death hazards on the highways. The present configuration of seat belts in use offers several obstacles to insure their being utilized. The straps are difficult to locate, straighten or untangle and considerable time and attention is required to overcome this handicap. The present belts are uncomfortable to wear due to the weight of the buckle and belt and due to the non-conformity of the belt to the contours of the seated passenger. Also, the handling required to retrieve and straighten the present belts results in early soiling of the belt.

This invention proposes to decrease the accident and death rate through use of an erecting passenger safety belt that is designed to give passenger a forceful reminder to fasten the belt. This invention eliminates the time and effort, now necessary, to fish out and straighten the belt halves. Also, this invention provides for passenger comfort as the belt rests lightly on the passenger since the belt furnishes most of its own support. The problem of soiled belts is greatly reduced as handling of the belt is eliminated as regards locating and straightening of the belt halves.

In accordance with the invention claimed and following construction of a successful working model, an improved seat belt is provided by erecting both belt halves pneumatically, alongside and curving inward over the passenger's midriff, as the passenger is seated.

Inflation pressure is provided by either; a compressor, a charged reservoir or by using the weight of the passenger to actuate a bellows, located under the seat, which in turn provides pressure to erect the seat belt. The subject drawing illustrates erection of the belt halves by utilizing the weight of the seated passenger to compress a bellows.

The objects and advantages of this invention will become more detailed from the following description and claims, and from the subject drawing, wherein:

FIGURE 1 is a side partial cutaway view of a front automotive type seat on which is mounted the improved seat belt;

FIGURE 2 is a front plan view of a front automotive type seat, giving location of the various components related to this invention;

FIGURE 3 is a fragmentary, cross section view, typical of the seat belt inflated area, showing both inflated and non-inflated conditions;

FIGURE 4 is a side plan view of the fastening buckle and of the pressure release valve; and FIGURE 5 is a cross section view of the seat bellows.

OPERATION

A typical cycle of seat belt erection and deflation would be as follows: The belts are limp and stowed while not inflated as in FIG. 2. The passenger assumes position on the seat, his weight compresses the atmosphere 10 trapped in the bellows 4 by the one way flapper valve 5; thereby forcing pressure into the connecting air tube 7 and into the pneumatically sealed portion 10 of the belt halves 2. The inrushing pressure to the hollow seat belt 2 induces the individual belt halves 2 to become semi-rigid and to swing upward and inward, as biased during construction 9, over the midriff of the passenger as shown in FIG. 2.

The belt will then remain erected, with both belt ends in easy view, and convenient to be fastened and adjusted. Upon fastening and adjustment, the belt remains erected, with little weight resting upon the person of the passenger. The belts will remain erected until the pressure relief valve 3 is actuated.

The relief valve 3 may be constructed as a part of the belt buckle 1 so that upon unsnapping the belt 2, the pressure 10 would bleed off and the belt halves 2 return to a limp and deflated condition. Or, the pressure relief valve 3 may be separate from the buckle 1 (as shown) so that the passenger may release the pressure 10 at his option.

Upon release of the entrapped pressurized atmosphere 10, the belts are limp, ready to be stowed, FIG. 2, and the passenger is free to leave the seat. Upon removal of the passenger's weight, the bellows 4 will spring to its preselected outer dimensions and renew its charge of air 10 through one way flapper valve 5. The system is then ready for the next cycle of operation.

SPECIFIC DESCRIPTION

Referring more particularly to the specific components of the invention, FIG. 1 illustrates a vehicle seat mounted on a floor plate or supporting member with pertinent attached devices of this invention indicated.

The metal buckle 1 is of conventional construction and may be any of the various types now in use or it may be designed for incorporaton of the relief valve 3 so that the relief valve is automatically actuated whenever the seat belt is unsnapped.

The seat belt 2 is constructed of a pliable material with adequate strength to serve the intended safety purpose, a material such as nylon being used. The belt 2 is of hollow construction. The belt 2 may either be split, treated with a sealing solution such as rubber and then bonded or it may be formed by using a preformed pneumatic tube that is encapsuled within the belt. The sealing coat is indicated by reference 8 on the drawing.

The seat belt 2 is affixed at the lower end to the floor plate or supporting member of the vehicle, passed upward between the horizontal and vertical seat members and outward to the passenger seating area. The portion of the belt 2 enclosed or treated for a sealed pneumatic cavity 10 need be only from the buckle 1 ends of the belt halves 2 to just below the horizontal seat member FIG. 1, A to B.

The construction and bonding of the belt halves 2 is controlled in that sufficient bias 9 is introduced, during construction, to project the inflated belt halves 2 alongside, upward and slightly inward over the seated passenger FIG. 2.

Both belt halves 2 give access to a bonded fitting, such as rubber, to which air tube 7 is connected. Only the buckle 1 half of the belt 2 has provision for the relief valve 3, however; both belt halves 2 may have the relief valve 3.

The pressure relief valve 3 is spring loaded and will return to the closed position when released. The valve may be incorporated into or adjacent to the buckle 1 so that release of the belt buckle 1 will also release the belt pressure 10, or, the pressure relief valve 3 may be separate from buckle 1 as shown in the drawing.

The bellows 4 is constructed of a flexible material, such as rubber, with some degree of rigidity so that it will return to its maximum displacement configuration when-over the weight of the passenger is removed. The exact size and shape is not critical, but the bellows 4 should be of sufficient width and breadth to extend beyond the area of seat contact by the passenger and of sufficient depth to contact both the seat bottom and the support plate 6. The bellows 4 has a one way, air in only, flapper type valve which is attached at one side of the valve 5, the attachment serving as a hinge. The bellows 4 air in valve 5 can be constructed as an integral part of the bellows 4. An outlet from the bellows 4 is provided for attachment of air tube 7.

The bellows support plate 6 is made of a material, such as steel, with sufficient strength to contain and resist, without undue distortion, the pressure of the passenger's weight as projected through the inflated bellows 4. The plate is of two parts, adjustable to various sized seats and fastened together with bolts after the individual plate halves are extended fore and aft to lock into the existing seat bases, skirts or springs.

The pneumatic tube 7 is of a non-metal type tubing, such as rubber, and is in the form of a T. The base of the T is attached to the outlet of the bellows 4 and the remaining two ends are attached to the fittings provided as inlets on the individual belt halves 2.

While certain specific embodiments of an improved passenger safety seat belt have been disclosed in the foregoing description, it will be understood that various modifications within the spirit of the invention may occur to those skilled in the art. Therefore, it is intended that no limitations be placed on the invention except as defined by the scope of the following claims.

What is claimed:

1. A seat belt apparatus for use in a vehicle having a seat, the apparatus comprising:
   a pair of inflatable straps, each of said straps attached at one end portion thereof to the vehicle and having the other end portion disposed in a normal position resting on the seat, said straps being normally deflated and limp; and
   fluid means fluidly connected to said straps and operable to inflate said straps, wherein upon inflation said other end portions are semi-rigid.

2. A seat belt apparatus as defined in claim 1, and further wherein upon inflation said other end portions move from said normal position to an erected position spaced above the upper surface of the seat.

3. A seat belt apparatus as defined in claim 2, and further wherein when said straps are disposed in said erected positions, the majority of the lengths of said straps are parallel each other, and with said other end portions turned inwardly toward each other, whereas said other end portions are adapted to partially encircle the midriff of a passenger seated between said straps.

4. A seat belt apparatus as defined in claim 3, and further wherein said fluid means contains a deformable container having a fluid tight interior adapted to contain fluid, and a conduit fluidly connecting said container to said straps, said container deformable in response to pressure on the outer surface thereof and returnable to its original configuration upon removal of said pressure, wherein said deformation forces said fluid through said conduit into said straps thus inflating same.

5. A seat belt apparatus as defined in claim 4, and further wherein said container includes a normally open intake valve mounted therein communicating said interior with the atmosphere, said intake valve movable from said normal position to a closed position in response to deformation of said container, wherein said interior is thereby closed off from the atmosphere.

6. A seat belt apparatus as defined in claim 5, and further wherein manually operable means is operatively connected with said fluid means for deflating said straps.

7. A seat belt apparatus as defined in claim 6, and further wherein said straps include belt buckles at the free other end portions thereof, and said deflating means is built into at least one of said buckles such that disconnection of said buckles effects operation of said deflating means to deflate said straps.

8. A seat belt apparatus as defined in claim 3, and further wherein said fluid means includes an air compressor and a conduit fluidly connecting said compressor to said straps, said compressor built into the seat with an upper surface thereof engaged with and depressed in direct response to downward movement of the seat upper surface whereby to inflate said straps.

References Cited by the Examiner

UNITED STATES PATENTS

| | | | |
|---|---|---|---|
| 2,031,870 | 2/1936 | Vertuno | 128—327 |
| 2,511,269 | 6/1950 | Jones | 128—327 |
| 2,811,970 | 11/1957 | Hipps et al. | 128—327 |
| 2,841,149 | 7/1958 | Marsden | 128—327 |
| 2,880,789 | 4/1959 | Liebinger | 297—385 |
| 3,146,460 | 9/1964 | Henderson | 297—386 X |
| 3,190,694 | 6/1965 | Issac | 297—388 |
| 3,197,234 | 7/1965 | Bertrand | 280—150 |

DAVID J. WILLIAMOWSKY, *Primary Examiner.*

JAMES T. McCALL, *Examiner.*